March 10, 1953 V. A. GREY 2,630,598
SAUSAGE SKINNING MECHANISM
Filed Oct. 12, 1950 4 Sheets-Sheet 2

INVENTOR.
Victor A. Grey.
BY
Cromwell, Greist & Warden
Attys.

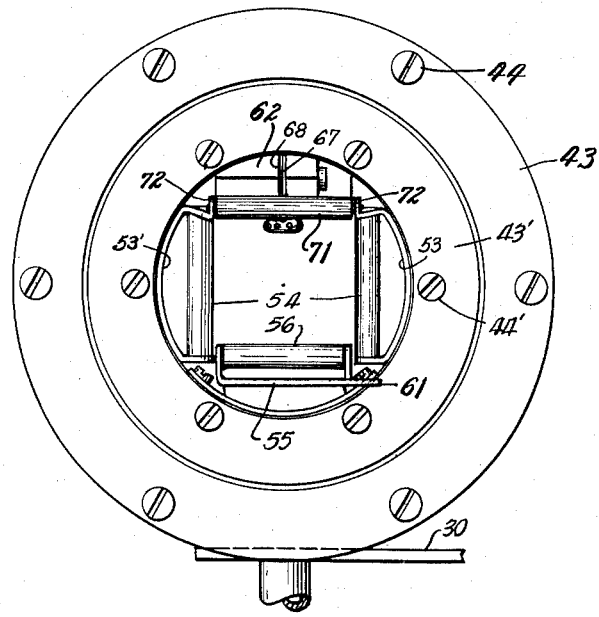
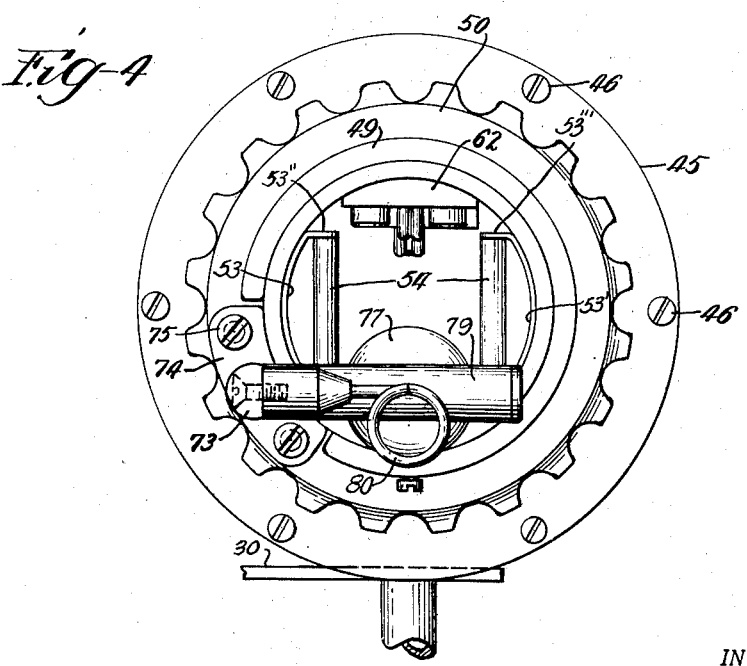

March 10, 1953 V. A. GREY 2,630,598
SAUSAGE SKINNING MECHANISM
Filed Oct. 12, 1950 4 Sheets-Sheet 4
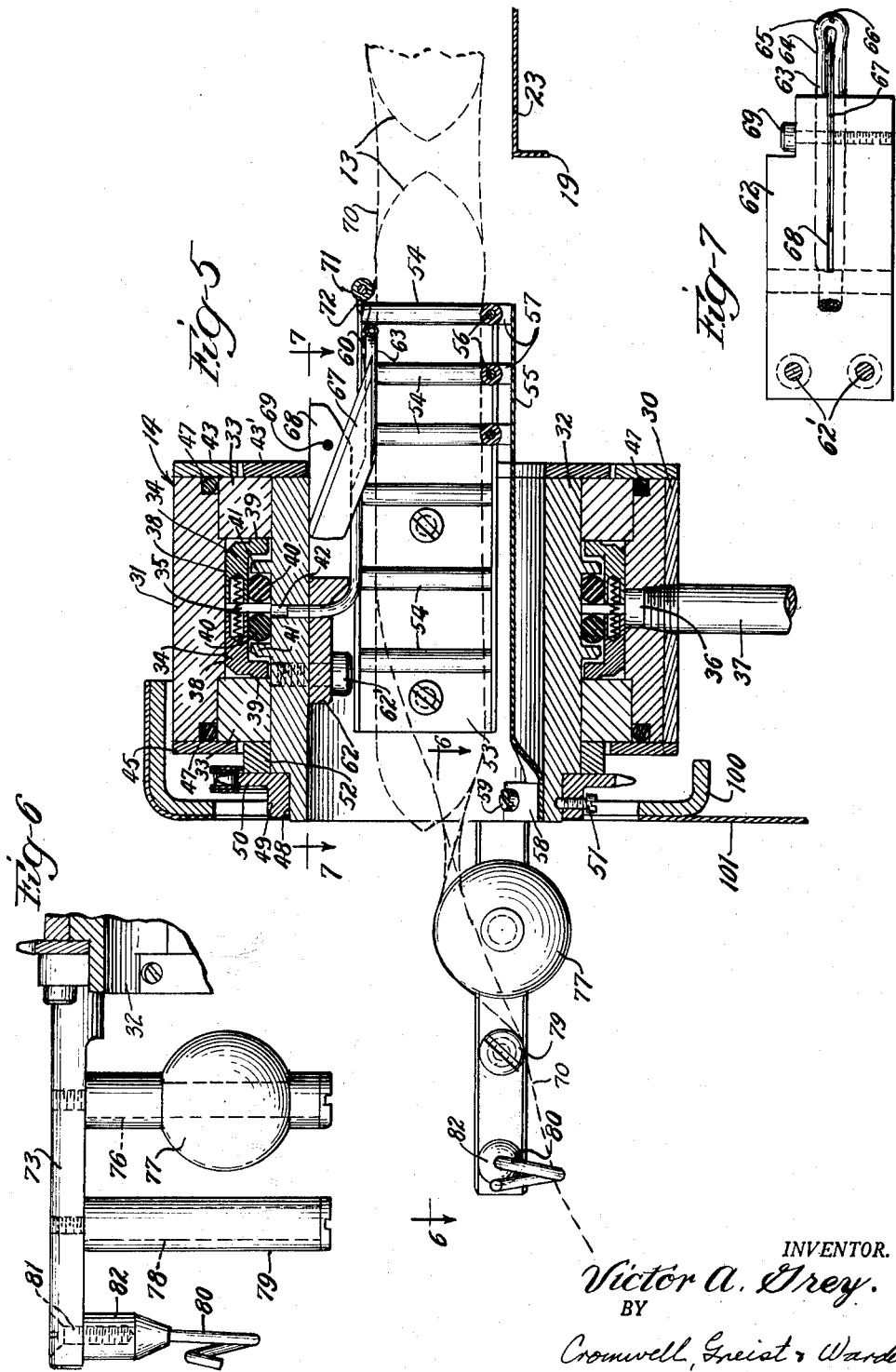
INVENTOR.
Victor A. Grey.
BY
Cromwell, Greist & Warden
Attys.

Patented Mar. 10, 1953

2,630,598

UNITED STATES PATENT OFFICE 2,630,598

SAUSAGE SKINNING MECHANISM

Victor A. Grey, Chicago, Ill., assignor, by mesne assignments, to Voss Brothers Manufacturing Co., Davenport, Iowa, a corporation of Iowa Application October 12, 1950, Serial No. 189,874

20 Claims. (Cl. 17—1)

This invention relates to the manufacture of skinless frankfurters or sausages and is more particularly concerned with improvements in mechanism for removing the casing or skin from a plurality of connected sausage links.

In the manufacture of skinless frankfurters or sausages a predetermined length of suitable sausage casing which is formed of cellulose film or similar material is filled or stuffed with the sausage meat and divided into a plurality of individual sausages or links of substantially uniform length, generally by twisting or otherwise constricting a small section of the casing between the individual links. The length of connected links is then processed by cooking and smoking or other treatment necessary to prepare the product for the market after which the individual links are separated by removing the casing or the skin, generally by hand.

It is a general object of the invention to provide mechanism for operating on successive sausages in a connected string to straighten the casing between each sausage and the next succeeding sausage, to loosen the casing around the successive sausages, to slit the casing lengthwise of the sausages and finally to completely separate the casing from the sausages.

It is a more specific object of the present invention to provide a machine for removing the skin or casing from a plurality of connected sausage links of the type which have been initially formed or linked by imparting a twist to a relatively small section of casing separating the successive links wherein there is provided means for rotating successive links to remove the twist between each link and the next succeeding link, means for loosening the casing around the links, means for slitting the casing longitudinally of the links, and means for separating the casing from the individual links.

It is a further object of the invention to provide a machine for removing the skin or casing from a plurality of connected sausage links, which links are characterized by being formed with a twisted section of casing separating the individual links and with the twisting being in the same direction, wherein mechanism is provided for rotating the links successively to remove the twist in the casing between each link and the next succeeding link, in combination with mechanism for moving the connected and encased links in an axial path and mechanism for automatically loosening and slitting the casing while the links are rotated and moved axially.

It is a further object of the invention to provide a mechanism for removing the casing from a plurality of connected sausages which comprises a rotatable hollow head, supporting members in the head for guiding the sausages axially of the same, a plow and slitting device arranged within the head and adapted to engage between the sausages and the casing to partially loosen the casing from the sausages and slit the same longitudinally as the sausages are moved through the head and casing removing members arranged adjacent the plow and slitting device for freeing the sausage from the casing.

It is still another object of the invention to provide a mechanism for skinning sausages and a guiding and supporting means for a plurality of connected sausage links which includes a tank having a conditioning bath therein which is held at a predetermined temperature sufficient to loosen the casing on the sausages and wherein the tank is arranged closely adjacent the skinning mechanism to permit the sausages to be moved from the bath directly to the skinning mechanism.

It is a further object of the invention to provide a mechanism for use in skinning sausages wherein the operation of the mechanism is at all times under the control of the operator.

These and other objects of the invention will be apparent from a consideration of the mechanism which is shown by way of illustration in the accompanying drawings, wherein:

Fig. 3 is a view, to an enlarged scale, of one end of the head which constitutes the skinning mechanism;

Fig. 4 is a view, to an enlarged scale, of the other end of the skinning mechanism;

Fig. 5 is a sectional view, taken on line 5—5 of Fig. 2, to an enlarged scale;

Fig. 6 is a top plan view of a portion of the skinning mechanism; and

Fig. 7 is a detail view taken generally on the line 7—7 of Fig. 5.

Figure 1:
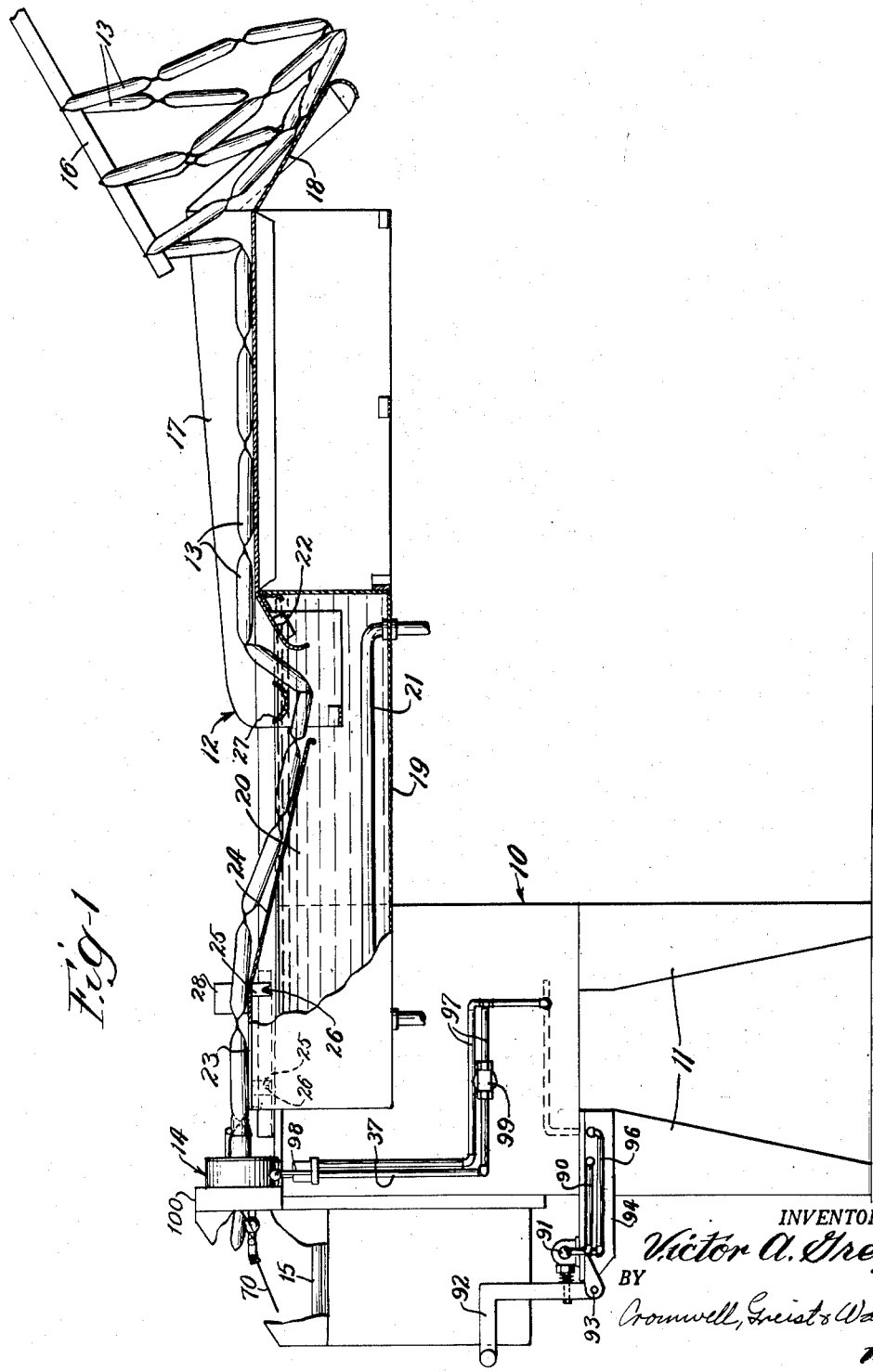
Fig. 1 is a side elevation, with portions in section, of mechanism embodying therein the principles of the invention.

Referring to the drawings, there is illustrated mechanism which embodies the principal features of the invention and which is adapted to remove the casing from a length or string of connected sausage links. The sausages with which the illustrated mechanism is adapted to be used are preferably of the type which are initially formed or linked by dividing a predetermined length of filled sausage casing into links of uniform length and rotating each successive link to impart a twist in the casing between it and the next succeeding link. Such sausages, when processed, may be readily untwisted by rotating each successive sausage in the opposite direction while the remainder of the string is held or remains in non-rotating relation thereto, the casing being of cellulose or similar material which does not adhere to itself in the twisted areas during the processing and which will not rupture under the tension developed during the untwisting operation.

Figure 2:
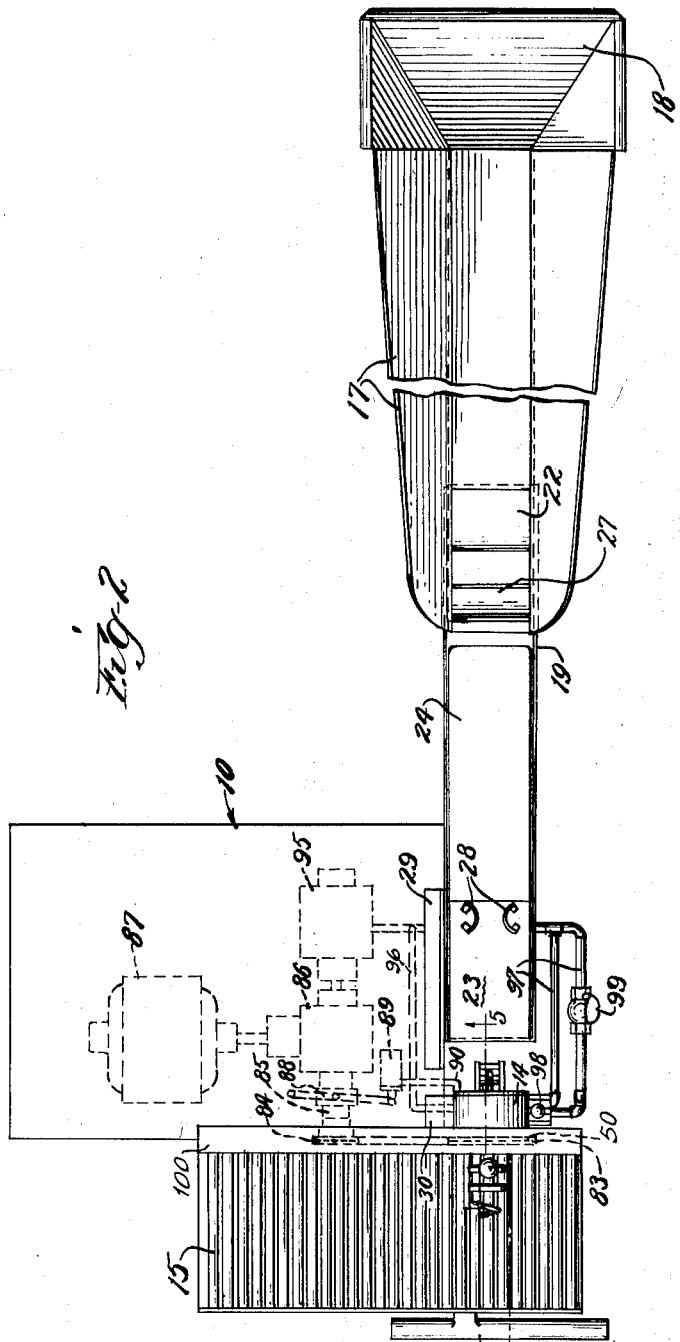
Fig. 2 is a plan view of the mechanism shown in Fig. 1.

The illustrated mechanism comprises (Figs. 1 and 2) a main supporting frame structure which includes a top cabinet or casing 10 and depending supporting legs 11. Along one side of the cabinet 10 there is mounted an elongate sausage supporting structure 12 for receiving a string of connected sausages 13 in partially strung-out or extended relation. A skinning device or head 14 is supported on the cabinet 10 at the end of the structure 12 with the receiving end in proper alignment therewith to receive the connected sausages 13 as they are moved longitudinally over the supporting feed structure 12. At the other end of the skinning head 14 a delivery chute or conveyor 15 is supported on the adjacent side of the cabinet 10 in downwardly inclined relation for receiving the individual sausages 13 as they are separated from the casing by the skinning device 14 and delivering them to a container or the like, for removal from the machine.

The supporting feed structure 12 on which the string of sausages 13 is positioned for delivery to the skinning head 14 has associated with it means for supporting a smoke stick 16 in downwardly inclined relation to the receiving end of the same (not shown). The smoke stick 16 initially supports the string of sausages 13 in looped formation thereon as they come from the smoke house. The stick 16 is initially arranged at the receiving end of the supporting structure 12 with the leading end of the string of sausages 13 positioned on the structure 12 for delivery to the skinning head 14.

The feeding or supporting structure 12 comprises an upwardly opening chute-like portion 17 of generally U-shaped cross section having a downwardly sloping extension 18 at the receiving end for guiding and supporting the loops on the stick 16. Between the chute-like portion 17 and the skinning head 14 an elongate liquid receiving tank 19 of substantial depth is arranged. The tank 19 is provided with a suitable liquid 20, such as water, which is maintained at a temperature of approximately 115°. Preferably, the tank 19 is supplied with a circulating liquid maintained at the proper temperature by the supply pipe 21. At one end of the tank 19, which is adjacent the chute 17, there is provided a downwardly inclined guide plate 22 for guiding the sausages into the liquid 20. At the other end of the tank 19, which is adjacent the skinning head 14, there is provided a removable platform 23 having an inclined depending plate portion 24 which extends into the liquid 20. The platform 23 includes depending side legs or brackets 25 which are slotted at the lower ends and supported on pins 26 extending inwardly of the side walls of the tank 19. The platform device 23 may be readily removed to facilitate cleaning and to provide access to the interior of the tank 19. A cross plate 27 having a curved bottom surface is arranged near the top of tank 19 between guide plates 22 and 24. The sausages 13 are moved through the chute portion 17 over the plate 22 and into the liquid 20. The plate 27 insures that the sausages are immersed in or pass through the liquid 20. The plate 24 guides the sausages as they emerge from the liquid and permits their arrangement on the platform 23 in alignment with the center of the skinning device 14. The platform 23 is provided with a pair of laterally spaced upstanding guide plates 28 for centering the sausages. The supporting structure 12 may be secured to the top wall of the cabinet 10 by means of a connecting angle plate 29 or similar bracket, bolted or otherwise secured to both members.

The casing removing or skinning head 14 is supported by a plate 30 extending from the top plate of the cabinet 10 adjacent the end of the tank 19. The head 14 comprises an outer member 31 consisting of a hollow or tube-like section which is rigidly secured at the bottom, by any conventional fastening means, to the plate 30, the latter being bolted or otherwise fastened to the top plate. The outer head member 31 is arranged with its longitudinal axis parallel to and spaced above the top of the platform member 23 approximately half the diameter of the sausages 13. The outer head member 31 is arranged in spaced relation forwardly of the end of the tank 19.

An inner head member 32 is received in rotatable relation in the fixed outer head member 31. The inner head member 32 consists of a tube-like section which has a somewhat smaller external diameter than the internal diameter of the outer member 31 and which is separated therefrom and supported for rotation therein by a pair of axially spaced carbon bearing rings 33 of substantial thickness. A pair of metal sealing rings 34, which are of generally L-shaped cross section, are arranged between the opposed inner faces of the bearing rings 33 and are urged away from each other toward the faces of the bearing rings 33 by peripherally spaced compression springs 35 seated in suitable aligned recesses provided in the opposed edges of the rings 34. The inner opposed edges or faces of the sealing rings 34 are spaced a sufficient distance apart to provide a passageway or chamber for a supply of air delivered through an aperture 36 extending radially in the bottom of the outer head member 31 by a supply pipe 37 which extends through an aperture in the supporting plate 30 and is connected in a suitable manner to the head member 31. The sealing rings 34 are arranged with their outer peripheral faces engaging the inner wall of the head member 31 at 38 and their outer oppositely directed end faces engaging the inner faces of the bearing rings 33 at 39. A pair of rubber O-rings 40 are arranged between the sealing rings 34 and the outer peripheral surface of the inner revolving head member 32 which are confined axially by rib or shoulder formations 41 provided on the peripheral surface of the member 32. The O-rings 40 are axially spaced. The head member 32 is provided with a radial aperture 42 which is in communication with the air receiving compartment formed between the inner faces of the sealing rings 34 and between the spaced O-rings 40.

A pair of end cover plate members 43 and 43' are secured on the end faces of the head members 31 and 32 adjacent the tank 19 by a plurality of screws 44 and 44' which are tapped into the ends of the head members 31 and 32, respectively. The cover plate member 43' is provided with a central aperture which corresponds approximately in size to the internal diameter of the inner head member 32. At the other end of the head 14 a cover plate 45 is secured by screws 46 to the end face of the outer head member 31. The cover plate 45 is provided with a central aperture which is somewhat larger than the external diameter of the inner member 32 which extends through the same. The cover member 45 extends inwardly over the outer end face of head member 31 and a portion of the end face of the bearing ring 33. Sealing gaskets 47 are arranged in recesses in the inner edges of the outer member 31 adjacent the outer edges of the bearing rings 33. The inner head member 32 is provided at the end remote from the tank 19 with a recess 48 in which there is seated the hub 49 of a sprocket 50 which is secured in non-rotatable relation to the member 32 by a set screw 51. A spacer washer 52 extends between the sprocket 50 and the bearing ring 33 within the central aperture in the end plate 45.

The inner rotatable head member 31 is provided with guiding means for directing the sausages axially therethrough and a casing separating and slitting device all of which rotate with the member 31. The guiding means for the sausages 13 comprises oppositely disposed elongate curved plates or bracket members 53, 53' which are generally C-shaped in cross section and which carry between bearing flanges 53'' and 53''' formed along the marginal edges thereof a plurality of relatively small elongate rollers 54 which are arranged in spaced relation axially of the head 14. The roller supporting members 53 extend a substantial distance outwardly of the face plate 43' and project above the level of the supporting shelf 23. The distance between the two sets of rollers 54 is somewhat greater than the diameter of the sausages 13 which are being fed to the head. The rollers 54 function to hold the sausages in alignment and guide them through the head 14.

A relatively thin elongate resilient plate 55 is arranged between the sets of rollers 54 and carries a plurality of rollers 56 which extend at right angles to the rollers 54 adjacent the ends thereof and which provide a resilient support for guiding the sausages 13. The rollers 56 are journaled in end bearing bracket members 57 on the resilient plate 55. The plate 55 is provided at its other end with an offset portion 58 which is secured by set screws 59 or the like to the inner wall of the head member with a major portion of the plate 55 spaced from the same. The rollers 56 are arranged on the end of the plate 55 adjacent the tank 19 and urge the sausages toward a casing separating and slitting device 60. A stop member 61 extends laterally of plate 55 beneath the edge of adjacent bracket 53 and limits the movement of rollers 56 toward the slitting device 60.

The casing separating and slitting device 60 is supported on a block 62 which is secured by the screws 62' to the inner wall of the rotatable head member 32 in oppositely disposed relation to the rollers 56 on the plate 55. The device 60 comprises a plow member 63 (Figs. 5 and 7) which consists of a reversely bent tube 64 having its ends extending through an aperture in the block 62 and secured in the aperture 42 in the head member 32. The head portion 65 formed by the bend in the tube is apertured at 66 and functions as a nozzle to deliver a stream of air through the aperture 66. A relatively thin knife blade or slitter member 67 extends upwardly between the two legs of the tube member 64 and into a slot 68 in the supporting block 62, being secured in clamped relation therein by the clamping screw 69 at the end of the block. The apertured head 65 of the plow member 63 is adapted to be positioned between the sausages 13 and the casing 70 so that air supplied to the head 65 will be forced some distance from the same and tend to loosen the casing 70 from the sausages 13 as they are moved along beneath the plow 63. The knife 67 slits the casing 70 as it is drawn against the same above the plow member 63.

A roller 71 is supported on bearing formations 72 formed on the ends of brackets 53 which tends to hold the sausages 13 on proper relation to the plow 63 as they pass beneath the same while the resilient plate 55 and rollers 56 mounted thereon tend to urge the sausages 13 against the plow 63, the movement of the plate being limited by the stop 61.

At the discharge end of the head member 32 an axially extending post or bracket member 73 is secured by a base plate 74 and screws 75 to the face of the sprocket 50. The post 73 carries a laterally directed pin or stub shaft 76 on which there is mounted in rotatable relation a small spherical member 77. Spaced immediately beyond the sphere 77 there is a second stub shaft 78 extending laterally of the post 73 in parallel relation to the shaft 76 which carries a small roller or rotatable sleeve 79. A wire pigtail member 80 is arranged at the free end of the post 73 immediately beyond the roller 79 with the center thereof offset relative to the center of the roller 79 and approximately in horizontal alignment with the bottom of the roller 79. The pigtail member 80 is secured to the supporting post 73 by a fastening screw 81 extending through the post 73 and into a base portion 82 of the pigtail 80. The sausage casing 70 is drawn down over the sphere 77, to reverse the direction of curvature and strip it from the sausages 13, after it is slit by knife 67. From the sphere 77 it is passed beneath the roller 79 and through the pigtail 80 as indicated in Fig. 5.

The inner head member 32 is rotated relative to the fixed outer member 31 by means of the sprocket 50 which is connected by a chain 83 (Fig. 2) to a driven sprocket 84 on the driven shaft 85 of a change speed device 86 which is connected in driving relation with the motor 87 within the cabinet 10. A clutch 88 is arranged on the driven shaft 85 which is controlled by an air cylinder 89. The air cylinder 89 is connected by a line 90 with a control valve 91 and which is knee-operated by the trip member 92 pivotally mounted at 93 on a bracket 94 extending from a main frame supporting leg 11. An air pump 95 which is driven from the change speed device 86 supplies air to the line 90 through connecting line 96 and also to the head 14, through connecting lines 97 which lead to supply line 37. A hand control valve 98 is provided in one line 97 adjacent the head 14 and a knee-operated control valve 99 is provided in the other connecting line 97 for operator control of the air delivered to the head 14.

The sprockets 50 and 84 and the connecting drive chain 83 are covered by a cover plate 100 which is secured to the one face of the supporting cabinet 10. A plate 101 secured to the cover plate 100 provides a support for the delivery chute or conveyor 15 which is arranged in downwardly inclined relation beneath the projecting post 73 on the head 14.

In operating the mechanism the tank 19 is supplied with water or other liquid of a suitable temperature and a string of sausages in coiled relation on the smoke stick 16 is supported at the receiving end of the trough formation 17. The leading end of the string is pulled across the bottom of the trough 17 and beneath the plate 27 so that the sausages are immersed in the water 20 in the tank 19. The end of the string is brought up onto the platform 23 and casing 70 at the end of the string is then cut off or opened up adjacent the leading end of the first sausage 13 after which the end sausage is threaded into the skinning head 14 with the apertured head 65 of the plow 63 being inserted between the sausage 13 and the casing 70. The head 14 is rotated to untwist the casing between the leading sausage and the next adjacent sausage after which the leading sausage is moved through the head to slit a sufficient length of the casing for the operator to grip the loose end and thread it over the sphere 77, beneath the roller 79 and through the pigtail 80. Air may be delivered to the apertured head 65 of the plow 63 by opening the valves 97 or 98 while the end sausage 13 is moved axially and rotated as required to untwist the casing 70 between it and the next succeeding sausage. With the string thus started into the head 14 the operator starts the head member 32 rotating by means of the knee-operated trip 92 and pulls the string of sausages through the head by means of the casing which has been threaded through the pigtail 80 at the end of the post 73. The operator is able to observe the untwisting of the individual sausages and can control the rotation of the head member 32 to provide for the proper rotation of the sausages while at the same time moving them longitudinally through the head and past the slitting knife 67 by pulling on the casing 70 beyond the pigtail 80. If there is any obstruction between any of the sausages to prevent unwinding or uncoiling of the casing between the same, the operator is able to stop the movement of the sausages a sufficient length of time to permit the removal of the obstruction and re-threading of the string in the head. If more or less than the usual number of twists have been made between any of the sausages the operator is able to rotate the head member the required amount to completely unwind the links. With sausages of a length of approximately 5½ inches which have been linked by two twists in the casing between the individual sausages the machine has been operated to remove the casing at the rate of 60 sausages per minute, with the head rotating at the rate of 120 R. P. M.

While in the illustrated form of the mechanism the longitudinal movement of the sausages is accomplished manually by the operator pulling on the free end of the casing, a mechanical means for automatically gathering the casing and moving the sausages through the head is contemplated. This may be accomplished by providing at a point beyond the pigtail 80 any suitable means for automatically gathering the stripped casing and having suitable driving connection with the change speed device 86.

I claim:

1. In a machine for untwisting successive link sausages and stripping the casing therefrom, the sausages being connected in a string by twists in the casing between the respective links, a rotatably mounted hollow head, means mounted on the head for guiding the string of sausages in an axial direction through the head, said guide means resiliently engaging the sausages to cause the same to rotate with the head, means connected in driving relation with the head for rotating the same to untwist the casing between successive sausages while the sausages are moved axially through the same, and means mounted on the head and rotatable with the head for slitting the casing continuously and for separating the casing from each successive sausage as it is moved through the head.

2. In a machine for removing the casing from link sausages, the sausages being connected in a string by twists in the casing between the respective links, an elongate hollow head, means mounting said head for rotation about its longitudinal axis, means associated with the head for guiding the string of sausages in an axial direction through the head, said guide means engaging the sausages in gripping relation to cause the same to rotate with the head, means connected in driving relation with the head for rotating the head to untwist the casing between successive sausages while the sausages are moved axially through the same, and means associated with said head for slitting the casing continuously and for separating the casing from the successive sausages as the string is moved through the head.

3. In a machine for removing the casing from link sausages, the sausages being connected in a string by twists in the casing between the respective links, a rotatable head having an axial passageway, means mounted on the head for guiding the string of sausages axially through the head, said guide means engaging the sausages and causing the successive sausages to rotate with the head, means controlled by the operator in driving relation with the head for rotating the head a sufficient number of turns to untwist the casing between successive sausages while the sausages are moved axially through the same, and means associated with the head for slitting the casing continuously and for separating the casing from each successive sausage as it is moved through the head.

4. In a machine for removing the casing from link sausages, the sausages being connected in a string by twists in the casing between the respective links, a casing stripping head having a tube-like member rotatably mounted therein, means for guiding the string of sausages in an axial direction through said tube-like member, said guide means being secured in said tube-like member, means connected in driving relation with said tube-like member for rotating said tube-like member to untwist the casing between successive sausages while the sausages are moved axially through the same, and means on said tube-like member for slitting the casing and for separating the casing from each successive sausage as it is moved through the same.

5. In a machine for untwisting successive link sausages and stripping the casing therefrom, the sausages being connected in a string by twists in the casing between the respective links, a head having a rotatable member therein with an axial passageway, means on said rotatable member for guiding the string of sausages through said passageway, said guide means gripping the sausages to cause the same to rotate with said member, means connected in driving relation with said member for rotating the same to untwist the casing between successive sausages while the sausages are moved axially therethrough, and means on said rotatable member for slitting the casing continuously and for separating the casing from each successive sausage as it is moved through said passageway.

6. A mechanism for stripping casings from a string of connected link sausages which sausages are characterized by a plurality of twists in the casing between the respective sausages, said mechanism comprising a rotatable head having an axial passageway therein for receiving successive sausages, a nozzle supported in said head in spaced relation to a portion of the wall defining said passageway and a slitting knife supported between the nozzle and the adjacent wall portion of said passageway, said nozzle and said slitting knife being rotatable with said head, means on said head for guiding successive sausages axially through said passageway with said nozzle engaging between the casing and the sausages, means connected with said nozzle for supplying a fluid to said nozzle to separate the casing from the sausages, and means connected in driving relation with said head for rotating said head to untwist the casing between the sausages as they are moved through said passageway.

7. A mechanism for stripping casings from a string of connected link sausages which sausages are characterized by a plurality of twists in the casing between the respective sausages, said mechanism comprising a stripping head having a tube-like rotatable member therein, a nozzle secured in said rotatable member in spaced relation to an inner wall thereof, a slitting knife secured between the nozzle and said adjacent wall, means associated with said tube-like member for guiding successive sausages through said tube-like member with said nozzle engaging between the casing and the sausages, means for delivering fluid under pressure to said nozzle to loosen the casing around the sausages, and means connected in driving relation with said head for rotating said head to untwist the casing between the sausages as they are moved through said passageway.

8. A mechanism for stripping casings from a string of connected link sausages which sausages are characterized by a plurality of twists in the casing between the respective sausages, said mechanism comprising a head having an inner rotatable member provided with internal walls defining an axial passageway for receiving therein successive sausages, a nozzle supported in said inner member in spaced relation to a wall of said passageway, a slitting knife supported between the nozzle and said wall, means on said inner member for guiding successive sausages through said passageway with said nozzle engaging between the casing and the sausages, means connected with said nozzle for supplying air under pressure to said nozzle to loosen the casing around the sausages, and means connected in driving relation with said inner member for rotating said inner member to untwist the casing between the sausages as they are moved through said passageway.

9. A mechanism for stripping casings from a string of connected link sausages which sausages are characterized by a plurality of twists in the casing between the respective sausages, said mechanism comprising a rotatable head member having a passageway therein for receiving successive sausages, a nozzle supported in said passageway, a slitting knife supported between the nozzle and the adjacent wall of said passageway, means supported in said passageway including resiliently mounted rollers for guiding successive sausages through said passageway with said nozzle engaging between the casing and the sausages, means connected to said nozzle for supplying a fluid under pressure to said nozzle to loosen the casing around the sausages, and means under the control of the operator and connected in driving relation with said head member for rotating said head member to untwist the casing between the sausages as they are moved through said passageway.

10. In a machine for removing the casing from a string of connected sausages which are characterized by a twist in the casing between the individual sausages, a casing straightening and removing mechanism comprising a stationary outer ring member, a rotatable inner ring member mounted therein, means for rotating said inner ring member, a casing loosening and slitting device supported in the receiving end of said inner ring member, and guide means associated with said device for engaging successive sausages and guiding the same relative to said device whereby the casing is continuously slit and separated from the sausages as they are moved in an axial direction through said inner ring member.

11. In a machine for removing the casing from a string of connected sausages which are characterized by a twist in the casing between the individual sausages, a casing slitting and removing mechanism comprising a stationary outer ring member, a rotatable inner ring member mounted therein, means for rotating said inner ring member, a casing loosening and slitting device secured within said inner ring member and extending from the receiving end thereof, guide means extending from the receiving end of said inner ring member for engaging successive sausages and guiding the same relative to said device whereby the casing is loosened from the sausages and longitudinally slit, and means extending from the delivery end of said inner ring member for separating the casing from the sausages as they are moved in an axial direction through said inner ring member.

12. In a machine for removing the casing from a string of connected sausages which are characterized by a twist in the casing between the individual sausages, a casing slitting and removing mechanism comprising a stationary outer ring member, a rotatable inner ring member mounted therein, means to rotate said inner ring member, a casing loosening and slitting device having a portion secured within one end of said inner ring member, guide means associated with said device for engaging successive sausages and guiding the same relative to said device whereby the casing is continuously loosened and slit, and a casing separating means extending beyond the other end of said inner ring member.

13. In a machine as recited in claim 12 wherein said casing separating means comprises a rotatable sphere arranged in the axial path of the sausages for receiving the casing in reversely bent relation after it engages the slitting device.

14. In a machine for removing the casing from a string of connected sausages which are characterized by a twist in the casing between the individual sausages, a casing slitting and removing mechanism comprising a stationary outer ring member having mounted therein a rotatable inner ring member, means for rotating said inner ring member, a casing loosening and slitting device secured to said inner ring member, guide means for engaging successive sausages and guiding the same relative to said device whereby the casing is continuously loosened and longitudinally slit, a supporting post extending at the delivery end of said inner ring member, a spherical member supported on said post and extending into the path of movement of the sausages to receive the casing and strip it from the sausages, and a roller and pigtail members supported on said post for guiding the casing away from said sphere.

15. A mechanism for removing the casing from a length of connected link sausages which sausages are characterized by a twist in the casing between the respective links, said mechanism comprising means for supporting a length of the casing in substantially extended relation, means for guiding the connected and encased sausages in a predetermined path, means for gripping each individual sausage successively and for rotating the same relative to the succeeding sausage to untwist the casing between the sausages, means arranged adjacent said path of movement for loosening and slitting the casing, and means arranged adjacent said path of movement for separating the casing from the sausages.

16. A mechanism for removing the casing from a length of connected link sausages which sausages are characterized by a twist in the casing between the respective links, said mechanism comprising means for supporting a length of the casing in substantially extended relation, means for guiding the connected and encased sausages in a predetermined path, a rotatable casing removing head, means in said head for gripping each individual sausage and for rotating the same relative to the succeeding sausage to untwist the casing between the sausages, means arranged in said head for loosening and slitting the casing, and means associated with said head for separating the casing from the sausages.

17. A mechanism for removing the casing from a length of connected link sausages which sausages are characterized by a twist in the casing between the respective links, said mechanism comprising an elongate trough for supporting a plurality of the connected links in substantially extended relation, a liquid containing tank for moistening the casing as the links are moved through the same, a supporting guide platform associated with said tank for receiving the links as they emerge from the liquid, a casing slitting and removing device adjacent said tank, said device being arranged to receive the sausages from the guide platform, and means for rotating said device to untwist the casing between the successive links as the links are delivered to the casing slitting and removing device.

18. A mechanism for removing the casing from a length of connected link sausages which sausages are characterized by a twist in the casing between the respective links, said mechanism comprising means for supporting a length of the casing in substantially extended relation, means for guiding the connected and encased sausages in a predetermined path, means for gripping each individual sausage successively and for rotating the same relative to the succeeding sausage to untwist the casing between the sausages, means arranged adjacent said path of movement for loosening and slitting the casing, means arranged adjacent said path of movement for separating the casing from the sausages and means arranged beyond said casing separating means for mechanically gathering the casing.

19. A mechanism for removing the casing from a length of connected link sausages which sausages are characterized by a twist in the casing between the respective links, said mechanism comprising means for supporting a length of the casing in substantially extended relation, means for guiding the connected and encased sausages in a predetermined path, a casing removing head, means in said head for gripping each individual sausage and for rotating the same relative to the succeeding sausage to untwist the casing between the sausages, means arranged in said head for loosening and slitting the casing, means associated with said head for separating the casing from the sausages and automatic means for mechanically gathering the casing as it leaves said casing separating means.

20. A mechanism for removing the casing from a plurality of connected sausages which sausages are characterized by a separating twist in the casing between the respective sausages, said mechanism comprising means for supporting one end of the connected sausages with the remainder of the sausages freely extending therefrom whereby to permit the sausages to be rotated for removing the twists between the sausages, a cylindrical head rotatably mounted adjacent said casing supporting means, drive means connected to said head for rotating the same, guide means mounted on said head for controlling said sausages as they advance in a predetermined path through said head, said guide means being arranged for engaging said casing on opposite sides, a loosening and slitting member on said head in spaced relation to said guide means and having a plow-like end positioned to engage between the casing and the sausages, a casing stripping member mounted on said head in aligned relation with said guide means, said casing stripping member having a generally convex surface positioned for engaging the outer surface of the loosened and slit casing and for guiding said casing in a direction generally laterally of said path of movement to progressively strip the casing from the sausages as the sausages advance along said path whereby said casing may be pulled through said head by force applied to the stripped portion of said casing.

VICTOR A. GREY.

REFERENCES CITED

The following references are of record in the file of this patent:

UNITED STATES PATENTS

| Number | Name | Date |
|---|---|---|
| 2,340,755 | Jacobson | Feb. 1, 1944 |
| 2,424,346 | Wilcoxon | July 22, 1947 |